Sept. 18, 1962  W. C. ELMORE ET AL  3,054,309
VIBRATORY DEVICE
Filed Feb. 20, 1959

INVENTORS
WILLIAM C. ELMORE
CARMINE F. DE PRISCO
BY
Arthur H. Seidel
ATTORNEY

United States Patent Office 3,054,309
Patented Sept. 18, 1962

3,054,309
VIBRATORY DEVICE
William C. Elmore, Media, and Carmine F. De Prisco, Glen Mills, Pa., assignors to Aeroprojects, Inc., West Chester, Pa., a corporation of Pennsylvania
Filed Feb. 20, 1959, Ser. No. 794,700
6 Claims. (Cl. 78—82)

The present invention is directed to a vibratory device and more particularly to vibrating bars and tubes having utility in ultrasonic applications such as vibratory welding.

There is provided by the present invention a resonant ultrasonic transmission line at whose end is a separately resonant vibratory power delivery tip, said tip being usable for example as a welding tip, which has its principal and longitudinal axis normal to the axis of the vibratory system to which it is attached. The longitudinal dimensions of the tip are greater than the end dimensions of the end of the vibratory coupling member to which the tip is attached, and the tip is employed in such a manner as to deliver vibratory power from its end or ends rather than from its face.

Moreover, with certain types of ultrasonic or vibratory welding equipment, such as some of the types described in patent applications filed in the name of James Byron Jones, William C. Elmore, and Carmine F. De Prisco, namely, Serial No. 579,780, filed April 23, 1956, for "Method and Apparatus Employing Vibratory Energy for Bonding Metals," now Patent No. 2,946,119, issued July 26, 1960; and Serial No. 579,779, filed April 23, 1956, for "Vibratory Seam Welder and Vibratory Seam Welding Process," now abandoned, we have found that the operation and utility of such equipment can be markedly enhanced by incorporation of the present invention. That is, by use of the present invention in the vibratory welding apparatus and process, it is possible when desired: (1) to increase and improve the clearance in back of the welding tip, and (2) to provide a relatively large-dimensioned final link in the acoustical transmission chain which will provide improved delivery of vibratory energy to the work area. Thus, we have found that by using a resonant rod, tube, or bar tip, we can effect delivery of substantial amounts of energy at a zone that is radially remote from the axis of a transducer-coupling system.

This invention has as an object the provision of a novel ultrasonic vibratory device.

This invention has as another object the provision of an ultrasonic vibratory device in which there is substantial clearance behind the delivering tip of the device.

This invention has as a further object the provision of a novel vibratory welder.

This invention has as a still further object the provision of a device which will deliver shear-type vibration at a point that is radially remote from the axis of a transducer-coupling system.

Other objects will appear hereinafter.

For the purpose of illustrating the invention there is shown in the drawings forms which are presently preferred; it being understood, however, that this invention is not limited to the precise arrangements and instrumentalities shown.

Figure 1:
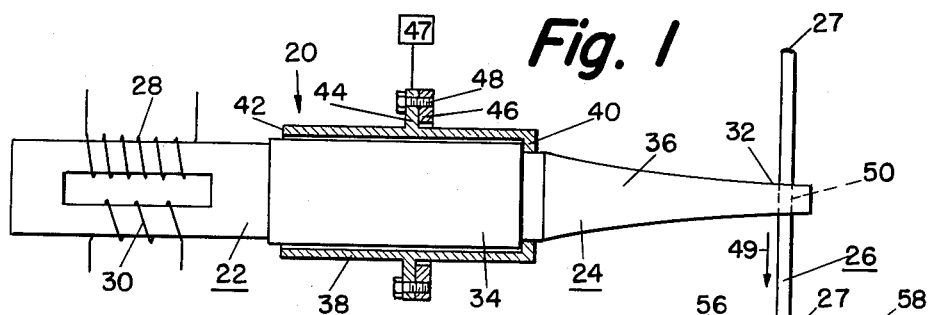
FIGURE 1 is a longitudinal view, partially in section, of one embodiment of the vibratory device of the present invention.

While applicants' invention in part concerns tips and the use of tips whose longitudinal dimensions are not necessarily comparable with the end dimensions of the vibrating coupler member to which they are attached, their invention is primarily concerned with the fact that the tips are independently resonant and that they are in the form of vibrating bars, rods, or tubes, and that energy is taken off from an end thereof. A theoretical discussion of the frequencies and modes of vibration of a bar free at both ends is presented in the book of H. F. Olson entitled "Acoustical Engineering" (D. Van Nostrand and Company, Inc., second edition, 1947, page 54, or in the 1957 revision at pages 58–59), wherein are provided a basic equation for the fundamental frequency (and thereby the dimensioning of such a bar) and variations of the equation for the dimensioning of bars of solid circular cross-section, of hollow circular cross-section, and of rectangular cross-section. However, the bar tip of the present invention is not a perfectly free bar, as specified by Olson, but is essentially a driven bar (preferably driven at the center loop region although it may be driven at other loop regions). Furthermore, the bar tip of the present invention is still less free when it, or one end of it, is used as a welding tip contacting materials during the welding process. We have discovered that bars, rods, or tubes driven in this manner and operated in certain modes of vibration are entirely practical for some ultrasonic power delivery systems and make efficient component parts thereof, even though they are loaded physically as well as acoustically.

As to the limitations regarding modes of vibration of a bar or rod in a power delivery system, while Olson, in the work cited above shows a number of modes of vibration of bars, tubes, or rods, and while theoretically tips dimensioned according to any mode in which there is a vibratory loop or active zone at the ends of the bar, tube or rod should be possible of use, at least to some extent we have found that tips dimensioned according to modes having a vibratory loop at the center of the bar, tube, or rod (i.e. midway between the ends of the bar, tube, or rod) as well as a vibratory loop at the ends of the bar or rod are to be preferred, such as tips dimensioned to operate at the fundamental frequency or the second overtone. Thus, such a mode of vibration of the bar or rod offers a convenient attachment zone at its center loop region for the end of the coupler to which it is attached. There then exists a condition of a vibratory loop at the coupler end contacting a vibratory loop of the bar or rod (loops being regions of maximum displacement amplitude) and offers active vibratory loops at the ends of the bar or rod which are desirable for efficient power delivery.

However, other modes of vibration such as the first or third overtone may be utilized if an off-center-driven array is desired.

It should be noted that for best performance the attachment zone may be in the center of the loop region or to either side of the center loop region, whichever will give the best impedance matching and as can be determined by one skilled in the art.

As to the dimensional requirements for construction and use of a resonant bar, rod, or tube, as part of the present invention, it will be apparent to anyone skilled in the art that, for efficient operation and to minimize energy losses, the bar, rod, or tube should be dimensioned so as to vibrate at the same frequency as does the vibratory system to which it is attached; i.e. that the transducer, coupling member, and tip should all be resonant at the same frequency. We have found that it is possible to calculate such dimensions after the equation of Olson for a bar free at both ends, which is the equation which we prefer (even though our embodiment is not really a free-free bar), such equation being:

$$f = \frac{1.133\pi}{l^2}\sqrt{\frac{Qk^2}{\rho}}$$

where $f$ is the frequency, $l$ is the length of the bar in centimeters, $Q$ is Young's modulus in dynes per square centimeter, $k$ is the radius of gyration, and $\rho$ is the density in grams per cubic centimeter.

The radius of gyration $k$ is given by Olson as:

(1) for a hollow circular cross-section:

$$k = \frac{\sqrt{a^2 + a_1^2}}{2}$$

where $a$ is the outside radius of the hollow bar in centimeters, and $a_1$ is the inside radius of the hollow bar, in centimeters.

(2) for a rectangular cross section:

$$k = \frac{a}{\sqrt{12}}$$

where $a$ is the thickness of the bar, in centimeters, in the direction of vibration.

(3) for a solid circular cross-section:

$$k = \frac{a}{2}$$

where $a$ is the radius of the bar in centimeters.

Furthermore, it is known to the art that $$\sqrt{\frac{Q}{\rho}} = C_1$$

which is the longitudinal velocity of sound, which, in steel, for example, is approximately $5.15 \times 10^5$ centimeters per second.

In a practical application, such as a specific vibratory welding situation involving specific geometries to be welded which demand certain clearances, or the making of a certain size weld spot, or the use of a particular frequency of operation, the given values are substituted in the classical equation, and the desired dimensions are calculated.

Thus, to obtain the length of a ⅛-inch diameter (0.31750 centimeter) solid circular cross-section bar made of steel to operate at 60 kc.:

$$f_1 = \frac{1.133\pi}{l^2} \times C_1 \times k$$

$$\left(k = \frac{a}{2} = \frac{0.15875}{2} = 0.08\right)$$

$$l^2 = \frac{1.133\pi}{6 \times 10^4} \times 5.15 \times 10^5 \times 0.08$$

$$l^2 = 2.444$$

$$l = 1.5633 \text{ cm. } (0.61547 \text{ in.})$$

If this is too small for joining to the coupler end and for the application at hand, the tip may be dimensioned to operate at the second overtone instead, whose frequency as a ratio of the fundamental $= 5.404\ f_1$ (according to Olson). To find the fundamental frequency which would enable the second overtone bar to vibrate at 60 kc., divide 60,000 cycles by 5.404, which equals 11.1 kc. Therefore:

$$l^2 = \frac{3.56 \times 5.15 \times 10^5 \times 0.08}{11.1 \times 10^3}$$

$$l^2 = 13.2432$$

$$l = 3.63 \text{ cm. } (1.42 \text{ in.})$$

The length of a bar of hollow circular cross-section or a bar of solid rectangular cross-section is obtained in the same manner by means of the heretofore stated classical equation and using the particular relationship of the radius of gyration for the particular type of bar.

It should be noted that the bar, rod, or tube need not be of uniform cross-section, but may be, for example, a wedge-shaped or tapered cantilever bar, the equation for which is set forth at pages 55–56 of Olson (1947 edition).

Resonant rods, bars, or tubes may be made of materials such as metal having desirable acoustical properties, such as metals including the following: aluminum, molybdenum, Monel metal, nickel, steel, titanium, etc.

As to the junction between the end of the coupler member and the center of the rod, bar or tube, for optimum vibration and operation the contact area dimension should be chosen to effect maximum power delivery with adequate mechanical strength of the system under power delivery conditions, and a metallurgical joint between coupler end and rod, bar or tube center, such as a brazed or a threaded-and-brazed joint, is preferred rather than other types of joinder.

One embodiment of the vibratory device of the present invention is shown in FIGURE 1 and is designated as 20.

The vibratory device 20 comprises the magnetostrictive transducer 22, the coupler 24, and the resonant tip 26.

The magnetostrictive transducer 22 is of conventional construction and comprises a laminated core of nickel, nickel-iron alloy, Permendur (an iron-cobalt alloy), Alfenol (an aluminum-iron alloy), or other magnetostrictive material, properly dimensioned to insure axial resonance with the frequency of the alternating current applied thereto so as to cause it to alter in length according to its coefficient of magnetostriction. The detailed construction of a suitable magnetostrictive transducer, which in the illustrated embodiment comprises a nickel stack, is well known to those skilled in this art and as above-indicated does not form a part of the present invention, and accordingly no detailed description of its construction will be made herein.

The magnetostrictive transducer 22 includes the polarizing coil 28 and the excitation coil 30. The desirability of magnetically polarizing the magnetostrictive transducer 22 by means of polarizing coil 28 in order for the metal laminations in the magnetostrictive transducer 22 to efficiently convert the applied RF energy from excitation coil 30 into elastic vibratory energy will be readily understood by one skilled in the art.

It will be appreciated by those skilled in the art, that in place of the magnetostrictive transducer 22 shown in the drawings, other known types of transducers may be substituted. For example, electrostrictive or piezoelectric transducers made of barium titanate, quartz crystals, lead titanate, lead zirconate, etc., may be utilized.

The magnetostrictive transducer 22 is metallurgically bonded in end-to-end contact as by silver brazing or the like to the coupler 24. The coupler 24 may be any one of a wide variety of couplers known to the art. In the illustrated embodiment the coupler 24 comprises the cylindrical coupling member 34 formed of solid steel and a second coupler member 36 which comprises a tapered coupler portion and an integral cylindrical portion, with the cylindrical portion being integral with or metallurgically bonded or screw-connected in end-to-end contact to the cylindrical coupler member 34. For the delivery of maximum power the tapered coupler portion of the second coupler member may be curved so as to have a taper that is an exponential function of its length and satisfies the following relation:

$$S = S_0 e^{-2Tl}$$

where $S_0$ is the reduced area at the end 32, $S$ is the area at the cylindrical portion of such second coupler member 36, $T$ is the taper factor constant, and $l$ is the length of the tapered coupler. This equation is set forth at page 163 of Piezoelectric Crystals and Ultrasonics, by Warren P. Mason, published in 1950 by Van Nostrand Company, and the design of the tapered portion is discussed therein, including a drawing thereof which Mason designates as a "Metal 'horn' for obtaining a large strain in a metal sample."

The cylindrical portion of the second coupler member 36 is supported by support mount 38. The support mount comprises a cylindrical metal shell, such as a cylindrical steel shell or a shell of other suitable resonant material. The shell 38 has a length of one-half wavelength according to the metal used at the applied frequency, or a length equal to a unit number of one-half wavelengths. In the illustrated embodiment, the shell 38 has a length equal to a single one-half wavelength. The shell 38 surrounds the cylindrical coupling member 34, being concentric therewith and spaced therefrom. At the end of the shell 38 which is furthest from the magnetostrictive transducer 22 there is a radially inwardly disposed flange 40 which is metallurgically bonded to the cylindrical portion of the second coupler bar 36. The end 42 of support mount 38 opposite from the flange 40 is free from any attachment, and accordingly when the vibratory device 20 is vibrating a true node will develop in the support mount 38 at flange 44, which is one-quarter wavelength distant from the free end 42 of support mount 38. Thus, the support mount 38 may be referred to as force insensitive mount. Flange 44 projects radially beyond the cylindrical shell portion of the support mount 38 and is connected to an exterior support means 46 by screws 48.

The support 38 is desirable for many applications, but in many applications the vibratory device 20 may be utilized without any mount, and other mounts different from the mount shown in the drawings may be used in conjunction with the vibratory device 20.

In the illustrated embodiment the magnetostrictive transducer 22, the cylindrical coupling member 34, and the second coupler member 36 are each dimensioned to have a length equal to one-half wavelength, and are designed to be resonant at the applied operating frequency so as to deliver the maximum amount of power, and to have the joints, namely the joints between the magnetostrictive transducer 22 and the cylindrical coupling member 34, the joint between the cylindrical coupling bar 34 and the second coupler bar 36, and the joint between the second coupler member 36 and the resonant tip 26, positioned at a loop of the wave motion whereby the joints of the vibratory device 20 will not be appreciably stressed.

Figure 2:
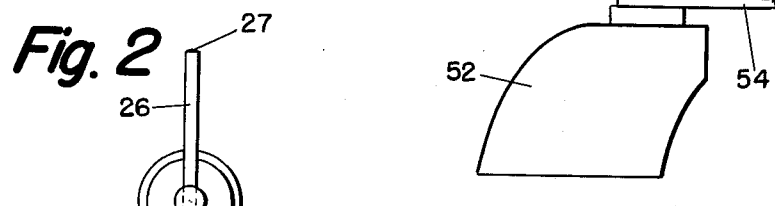
FIGURE 2 is a front elevational view of the vibratory device shown in FIGURE 1.

The resonant tip 26 comprises a solid rod of circular cross-section having flat end surfaces 27 and acoustically driven at its center (i.e. midway between its end surfaces). As shown in FIGURES 1 and 2, second coupler member 36 has a hole 50 extending diametrically therethrough adjacent its free end and tip 26 extends through the hole 50. Tip 26 is secured at its center to coupler 24 by brazing.

The resonant tip 26 should in a preferred embodiment be dimensioned according to the equation heretofore provided to vibrate at or about the design frequency so as to provide a solid bar of circular cross-section having a vibratory loop at its center and a vibratory loop at each of its end surfaces.

FIGURE 1 also shows the application of the vibratory device of the present invention as a welder, namely for spot welding.

The conditions under which welding may be effected with the vibratory device of the present invention are those conditions which have heretofore been developed in connection with vibratory welding. These conditions may be summarized as follows:

Welding is effected under a clamping force in the direction of arrow 49 sufficient to hold the metals being welded in firm contact at the intended weld interface.

The clamping force may thus be varied over a wide range. Thus, in a preferred embodiment, the maximum clamping forces need not produce an external deformation[1] of more than about ten percent in weldments effected at room or ambient temperatures. In many cases the extent of deformation is appreciably below 10%. and in some instances may be virtually absent altogether. The minimal clamping force to be used in the process of this invention constitutes a force sufficient to maintain the metals being welded in regulated alignment and firm contact, e.g. contacting each other so that the weld may be effected by the application of vibratory energy.

The range of operative clamping pressures which may be employed may be readily ascertained by the user of the process. In all cases the clamping force must be sufficient to effect coupling between the metals being welded and the source of vibratory energy, so that such vibratory energy may be transmitted to the metals.

The range of 59 to 300,000 cycles per second is operative for vibratory welding, but practical limitations as to the usable size of the tip of the present invention may restrict operation to a narrower frequency range depending on practicality of tip dimensions, which will be apparent on inspection of calculation results. It should be noted, also, that operation below about 15,000 cycles per second may be objectionable to the ear, as being in the audible range.

Welding may be and in many instances is initiated at room temperatures or ambient temperatures without the application of heat.[2] If desired, welding may also be initiated at elevated temperatures below the fusion temperature (melting point or solidus temperature of any of the pieces being bonded).[3] Thus, heating the metals to be welded prior to, and/or during welding to a temperature below their fusion temperature may, in some cases, facilitate the ease of welding and lower the power requirements and/or time requisite to achieve welding.

The welding process may be applied to a variety of metals and alloys, examples of which include: aluminum to aluminum; aluminum alloy to aluminum alloy; copper to copper; aluminum alloy to copper; steel to steel; aluminum alloy to steel; etc.

Welding is accomplished within a wide time range, such as a time range of between about 0.001 second to about 6.0 seconds, with welding under most normal conditions being effected during a time interval of from several hundredths of a second to several seconds.

The welding of most metals can be effected in the ambient atmosphere. However, the process comprehends welding under vacuum conditions or in selected conditions such as atmospheres comprising an inert gas. Furthermore, while the welding process may be effected with metals, such as aluminum, without the extensive precleaning required to effect satisfactory welding by other methods, a degree of precleaning and surface treatment may prove advantageous in the welding of many metals. It is desirable prior to effecting welding in accordance with the present invention to remove surface contaminants, such as hydrocarbon and other lubricants and the like.

Referring to FIGURE 1, for welding the vibratory device 20 in this case is used with an anvil 52. The anvil 52 is provided with a flat uppermost surface and is juxtaposed to and spaced from the resonant tip 26.

The workpieces 54 and 56 which undergo welding comprise pieces of sheet metal disposed between the resonant tip 26 and the anvil 52.

The workpieces 54 and 56 are maintained in regulated alignment and firm contact due to the force exerted on them by their engagement with the resonant tip 26. Such force may be supplied by suitable mechanical means, such as spring means, compressed air cylinder means, hydraulic

---

[1] By deformation is meant the change in dimensions of the weldment adjacent the weld zone divided by the aggregate thickness of the weldment members prior to welding; result multiplied by 100 to obtain percentage.

[2] The weldment may be warm to the touch after the weld due to the application of the elastic vibratory energy.

[3] The temperatures to which the foregoing statements refer are those which can be measured by burying diminutive thermocouples in the weld zone prior to welding, as well as the temperatures which can be estimated or approximated from a metallographic examination of a cross-section of a vibratory weld in the ordinary magnification range up to about 500 diameters.

cylinder means, and the like, diagrammatically shown by means 47. The direction of vibration of the resonant tip 26 is shown by the double-headed arrow 58. Welding is effected between the metal workpieces 54 and 56 under the conditions heretofore set forth by introducing elastic vibration from the resonant tip 26 to the workpiece 56. Said elastic vibration includes a component substantially parallel to the interface between the workpieces 54 and 56 being bonded or a component in a plane tangent to the portion of the resonant tip 26 which engages the metal workpiece 56, the resonant tip 26 being vibrated in the direction of the double-headed arrow 58 on the uppermost surface of the workpiece 56 while the aforesaid clamping force is being applied.

For example, using a 3/64-inch diameter rod-shaped tip made of steel and designed to operate at a nominal frequency of 60,000 cycles per second, a piece of 0.0005 inch diameter gold wire was welded to a piece of 0.032 inch diameter phosphor-bronze wire, when the vibratory device 20 was operating at a nominal frequency of 60,000 cycles per second, using an input power of 15 watts, a clamping force of 1.5 pounds, and a welding time of 0.15 second. Using the same tip, a piece of 0.002 inch platinum-iridium wire was welded across the end of a brass plug, using an input power of 34 watts, a clamping force of 4.25 pounds, and a welding time of 0.18 second.

Figure 3:
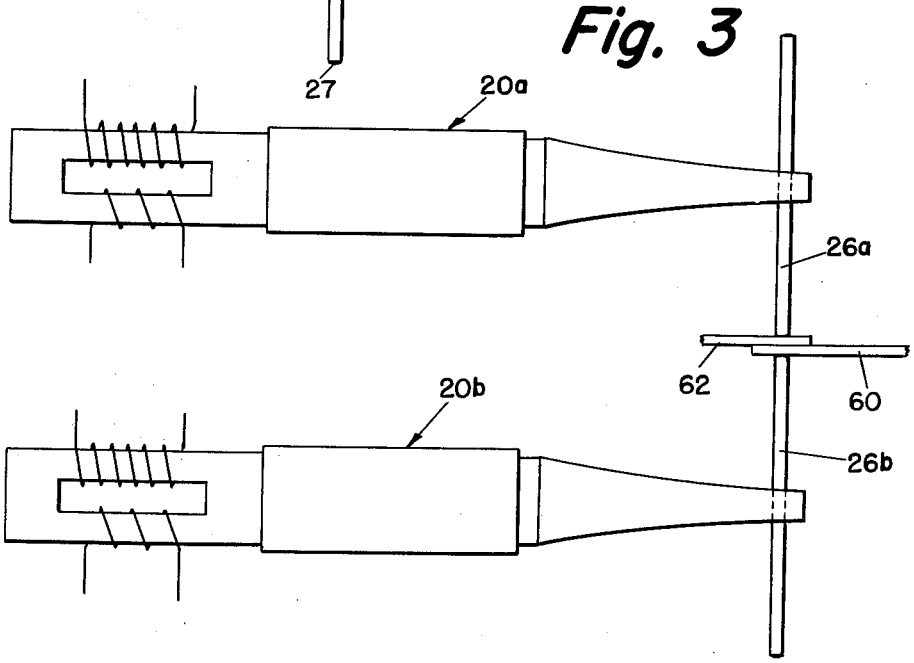
FIGURE 3 is an elevational view of yet another embodiment of the vibratory device of the present invention.

FIGURE 3 shows another embodiment of a vibratory welding system using the vibratory device of the present invention which is capable of operating at high power levels. In the vibratory welding system of FIGURE 3, there is substituted for the anvil 52 a second vibratory device of the present invention. Thus, in the embodiment shown in FIGURE 3 the metal workpieces 60 and 62 are welded together between the resonant tips 26a and 26b of the vibratory devices 20a and 20b respectively, with the clamping force being applied between the resonant tips 26a and 26b. The vibratory devices 20a and 20b operate at the same frequency but are 180 degrees out of phase with each oher. Thus, as the resonant tip 26a is moving across the metal workpieces 60 and 62 in one direction, the resonant tip 26b is moving across the workpieces in the other direction. The construction of each of the vibratory devices 20a and 20b is the same as the construction of vibratory device 20 in FIGURE 1.

If desired, two or more resonant rod or bar type tips of equal length can be attached together at their center regions to the form of crossed bars or rods to form a tip which might be rolled so as to form spaced spot welds or placed inside a tube so as to weld several spots at a time on the tube wall, or have the ends ground to the same or different radii so as to provide substitute tips as needed. Such a crossed rod or bar tip can be formed by joining separate rods or bars, or can be machined from one piece so as to have a joined center with protruding arms.

It should be noted that welding with the resonant rod or bar type tip of the present invention is particularly suitable for welding with low clamping forces (as in welding delicate objects). It is generally less suitable when higher clamping forces are necessary (such as several hundred pounds).

The present invention may be embodied in other specific forms without departing from the spirit or essential attributes thereof and, accordingly, reference should be made to the appended claims, rather than to the foregoing specification as indicating the scope of the invention.

By "free-free" as used herein is meant an elongated member which is free at both of its ends, namely devoid of a mass or other structure at either end.

We claim:
1. A vibratory device for delivering vibratory energy comprising means for generating vibratory energy of a predetermined frequency, a free-free tip, and coupler means connecting said tip and said means for generating vibratory energy, with said tip comprising a bar having a pair of spaced free end surfaces for delivering vibratory energy from at least one of said end surfaces in a plane substantially perpendicular to the longitudinal axis of said bar to a workpiece, said bar having a uniform thickness along its entire length, means for impelling said one end surface into intimate contact with a workpiece, said coupler means being joined to said tip solely at one region, with said one region being intermediate the end surfaces of said tip, with said tip being of sufficient size to be resonant at said predetermined frequency, and with said tip being guided solely at its region of juncture with said coupler means.

2. A welding device for welding together the contacting surfaces of a plurality of metal members which includes a tip comprising a free-free bar of uniform thickness along its entire length and having a pair of spaced free end surfaces, said free-free bar delivering vibratory energy from at least one of its end surfaces which engages the metal members undergoing welding, support means for supporting the metal members undergoing welding juxtaposed to and spaced from said one end surface of said tip, means for generating elastic vibration of a predetermined frequency, said elastic vibration having a elastic vibratory component in the tangent plane of the end surface which engages the metal members undergoing welding, said tip being coupled to said means for generating elastic vibratory energy solely at one region, with said one region being intermediate the tip's end surfaces, with said tip being of sufficient size to be resonant at said predetermined frequency, and with said tip being guided solely at its region of coupling to the elastic vibration generating means.

3. A vibratory device for delivering vibratory energy of a predetermined frequency, and a free-free tip comprising a bar having a pair of spaced free end surfaces for delivering vibratory energy from at least one of said end surfaces to a workpiece, the longitudinal axis of said tip being angularly disposed to the longitudinal axis of said means for generating vibratory energy, said tip being coupled to said means for generating vibratory energy solely at one region, said one region being equidistant from the ends of said bar, said bar having vibratory loops at said end surfaces, said tip being of sufficient size to be resonant at said predeterminde frequency, and said tip being guided solely at its region of coupling to the vibratory energy generating means.

4. A welding device in accordance with claim 2 in which the thickness and length of the bar are related to the predetermined frequency in accordance with the following equation:

$$f = \frac{1.133\pi}{l^2}\sqrt{\frac{Qk^2}{\rho}}$$

where $f$ is the frequency, $l$ is the length of the bar in centimeters, $Q$ is Young's modulus in dynes per square centimeter, $k$ is the radius of gyration, and $\rho$ is the density in grams per cubic centimeter.

5. A welding device for welding together the contacting surfaces of a plurality of metal members which includes a pair of tips, each of said tips comprising a free-free bar having a pair of spaced free end surfaces, said free-free bar delivering vibratory energy from at least one of its end surfaces which engages the metal members undergoing welding, said tips being on opposite sides of said metal members, separate means for generating elastic vibration secured to each of said tips, said elastic vibration having an elastic vibratory component in a plane parallel to the interface of the metal members undergoing welding, means for impelling said one end surface on each bar into intimate contact with the metal members, each of said tips being coupled to its respective means for generating elastic vibration solely at one region, with said one region being intermediate the end surfaces of said tip, with said tips having a sufficient size to be resonant at said predetermined frequency, and with each of said tips being guided solely at its region of coupling to the vibratory energy generating means.

6. A welding device in accordance with claim 5 in which one of said means for generating elastic vibration is 180 degrees out of phase with the other means for generating elastic vibration.

References Cited in the file of this patent

UNITED STATES PATENTS

| | | |
|---|---|---|
| 2,222,906 | Hentzen | Nov. 26, 1940 |
| 2,946,119 | Jones | July 26, 1960 |

FOREIGN PATENTS

| | | |
|---|---|---|
| 1,087,440 | France | Aug. 25, 1954 |